US007948945B2

(12) United States Patent
Budampati

(10) Patent No.: US 7,948,945 B2
(45) Date of Patent: May 24, 2011

(54) METHOD AND APPARATUS FOR IMPROVED MESSAGE DELIVERY FOR HIGHER PRIORITY NODES OR MESSAGES IN AN INDUSTRIAL WIRELESS NETWORK

(75) Inventor: Ramakrishna S. Budampati, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 761 days.

(21) Appl. No.: 12/018,406

(22) Filed: Jan. 23, 2008

(65) Prior Publication Data
US 2009/0185547 A1    Jul. 23, 2009

(51) Int. Cl.
*H04Q 7/00*     (2006.01)
*H04B 7/216*    (2006.01)
*H04J 3/00*     (2006.01)
(52) U.S. Cl. .................... 370/330; 370/335; 370/345
(58) Field of Classification Search .......... 370/235–294, 370/400, 330, 345, 335; 710/36, 244; 700/245, 700/258
See application file for complete search history.

(56) References Cited

U.S. PATENT DOCUMENTS

| | | | | |
|---|---|---|---|---|
| 7,830,838 | B2 * | 11/2010 | Kohvakka et al. | 370/330 |
| 2004/0081091 | A1 | 4/2004 | Widmer et al. | |
| 2007/0076600 | A1 | 4/2007 | Ekl et al. | |
| 2007/0150631 | A1 * | 6/2007 | Druke et al. | 710/244 |

FOREIGN PATENT DOCUMENTS
WO    WO 2006/067271 A1    6/2006

OTHER PUBLICATIONS

Ramakrishna S. Budampati et al., "System and Method for Providing Simultaneous Connectivity Between Devices in an Industrial Control and Automation or Other System", U.S. Appl. No. 11/981,212, filed Oct. 30, 2007.
Ramakrishna S. Budampati et al., "Apparatus and Method Supporting a Redundancy-Managing Interface Between Wireless and Wired Networks", U.S. Appl. No. 11/888,090, filed Jul. 31, 2007.

* cited by examiner

*Primary Examiner* — Afsar M. Qureshi
(74) *Attorney, Agent, or Firm* — Munck Carter, LLP

(57) ABSTRACT

A method includes communicating, during a first time slot, with a first wireless node in a wireless network. The method also includes determining that the communication with the first wireless node requires additional time beyond the first time slot. The method further includes identifying a priority associated with the first wireless node and a priority associated with a second wireless node in the wireless network, where the second wireless node is associated with a second time slot. In addition, the method includes communicating, during the second time slot, with the first wireless node when the priority associated with the first wireless node exceeds the priority associated with the second wireless node. The method may also include identifying routes through the wireless network for data associated with the first wireless node and data associated with the second wireless node. The routes may be based on the priorities of the wireless nodes.

20 Claims, 5 Drawing Sheets

METHOD AND APPARATUS FOR IMPROVED MESSAGE DELIVERY FOR HIGHER PRIORITY NODES OR MESSAGES IN AN INDUSTRIAL WIRELESS NETWORK

TECHNICAL FIELD

This disclosure relates generally to communication networks and more specifically to a method and apparatus for improved message delivery for higher priority nodes or messages in an industrial wireless network.

BACKGROUND

Many buildings, facilities, and other structures include secure communication networks, which are used for wireless and other types of communications. For example, chemical plants and other industrial facilities often include wireless networks, which can be used for a wide variety of purposes. As particular examples, the wireless networks in industrial facilities could be used to transport data to and from process controllers, process sensors, and process actuators. The wireless networks could also facilitate wireless communications between personnel working in the industrial facilities.

SUMMARY

This disclosure provides a method and apparatus for improved message delivery for higher priority nodes or messages in an industrial wireless network.

In a first embodiment, a method includes communicating, during a first time slot, with a first wireless node in a wireless network. The method also includes determining that the communication with the first wireless node requires additional time beyond the first time slot. The method further includes identifying a priority associated with the first wireless node and identifying a priority associated with a second wireless node in the wireless network, where the second wireless node is associated with a second time slot. In addition, the method includes communicating, during the second time slot, with the first wireless node when the priority associated with the first wireless node exceeds the priority associated with the second wireless node.

In particular embodiments, the first and second wireless nodes communicate using different frequencies or sets of frequencies. The method also includes ignoring a communication from the second wireless node during the second time slot.

In other particular embodiments, the method also includes identifying at least one first route through the wireless network for data associated with the first wireless node and at least one route through the wireless network for data associated with the second wireless node. The at least one first route could be based on the priority associated with the first wireless node, and the at least one second route could be based on the priority associated with the second wireless node.

In yet other particular embodiments, the method also includes routing data associated with the first wireless node before routing data associated with the second wireless node.

In still other particular embodiments, the method also includes determining if an acknowledgement is received in response to communication of data associated with the first wireless node and communicating the data associated with the first wireless node again when no acknowledgement is received.

In additional particular embodiments, each of the wireless nodes includes a sensor and/or an actuator in an industrial control and automation system.

In a second embodiment, an apparatus includes at least one transceiver configured to communicate with a plurality of wireless nodes in a wireless network. The apparatus also includes at least one controller configured to communicate with a first of the wireless nodes during a first time slot and to determine that the communication with the first wireless node requires additional time beyond the first time slot. The at least one controller is also configured to identify a priority associated with the first wireless node and to identify a priority associated with a second of the wireless nodes, where the second wireless node is associated with a second time slot. In addition, the at least one controller is configured to continue to communicate with the first wireless node during the second time slot when the priority associated with the first wireless node exceeds the priority associated with the second wireless node.

In a third embodiment, a method includes receiving data from a first wireless node in a wireless network. The method also includes identifying a priority associated with the first wireless node and identifying at least one first route through the wireless network for the data from the first wireless node. The at least one first route is based on the priority associated with the first wireless node. The method also includes communicating the data from the first wireless node along the at least one first route.

In particular embodiments, the method also includes receiving data from a second wireless node in the wireless network, identifying a priority associated with the second wireless node, and identifying at least one second route through the wireless network for the data from the second wireless node. The at least one second route is based on the priority associated with the second wireless node. The method further includes communicating the data from the second wireless node along the at least one second route.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
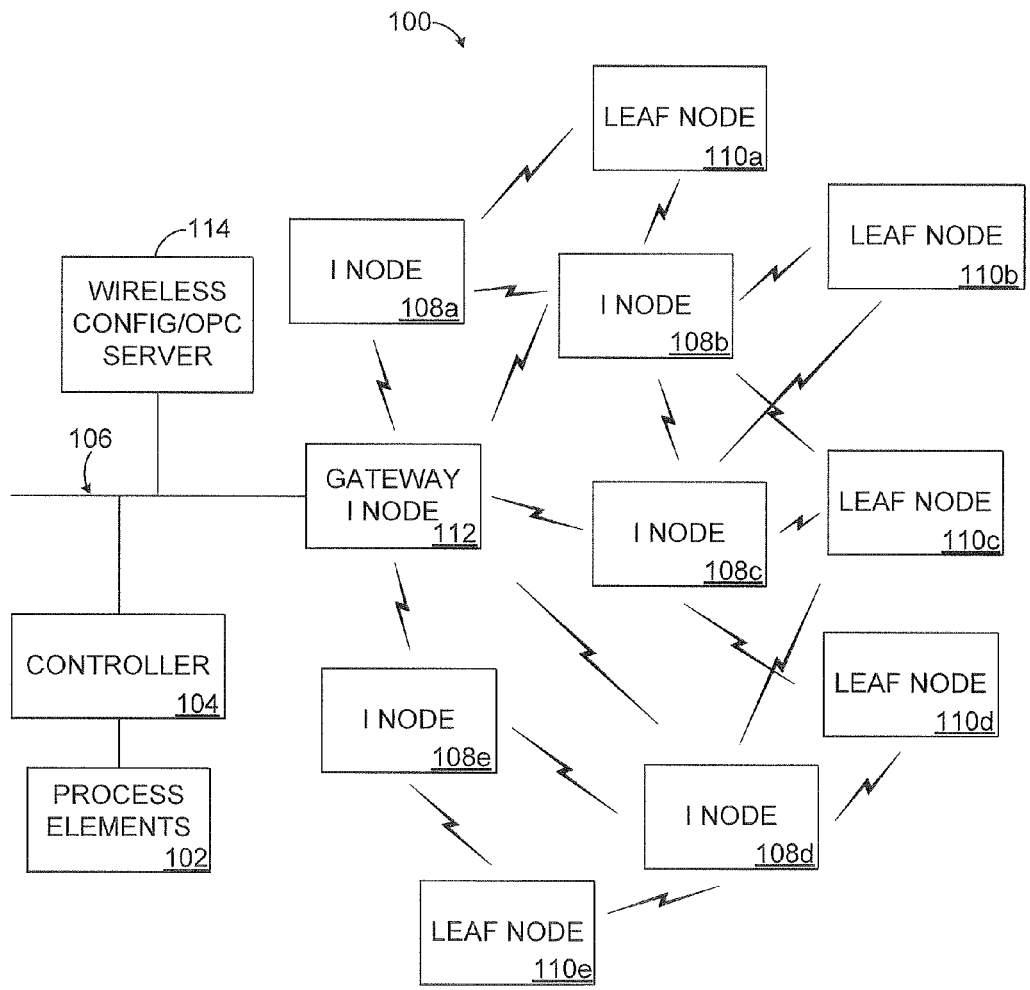
FIG. 1 illustrates an example industrial control and automation system according to this disclosure.

FIG. 1 illustrates an example industrial control and automation system 100 according to this disclosure. The embodiment of the industrial control and automation system 100 shown in FIG. 1 is for illustration only. Other embodiments of the industrial control and automation system 100 could be used without departing from the scope of this disclosure.

In this example embodiment, the industrial control and automation system 100 includes one or more process elements 102. The process elements 102 represent components in a process or production system that may perform any of a wide variety of functions. For example, the process elements 102 could represent sensors, actuators, or any other or additional industrial equipment in a processing environment. Each of the process elements 102 includes any suitable structure for performing one or more functions in a processing or production system. Also, the phrase "industrial control and automation system" generally refers to a system that automates and controls at least one process.

A controller 104 is coupled to the process elements 102. The controller 104 controls the operation of one or more of the process elements 102. For example, the controller 104 could receive information associated with the system 100, such as by receiving sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations.

As shown in FIG. 1, the industrial control and automation system 100 also includes one or more wireless networks for communicating with wireless sensors or other wireless devices. In this example, a wireless network (such as a mesh network) is formed using infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the nodes 108a-108e and 110a-110e form a wireless network capable of providing wireless coverage to a specified area, such as in a large industrial complex.

In this example, the nodes 108a-108e and 110a-110e are divided into infrastructure nodes and leaf nodes. The infrastructure nodes 108a-108e typically represent line-powered devices, meaning these nodes receive operating power from an external source. As a result, these nodes 108a-108e are typically not limited in their operations since they need not minimize power consumption to increase the operational life of their internal power supplies. On the other hand, the leaf nodes 110a-110e typically represent battery-powered devices, meaning these nodes receive operating power from internal batteries or other power supplies. Because of this, these nodes 110a-110e are often more limited in their operations in order to help preserve the operational life of their internal power supplies.

Each of the nodes 108a-108e and 110a-110e includes any suitable structure facilitating wireless communications, such as an RF transceiver. Each of the nodes 108a-108e and 110a-110e could also include other functionality, such as functionality for generating or using data communicated over the wireless network. For example, the leaf nodes 110a-110e could represent wireless sensors in an industrial facility, where the sensors are used to measure various characteristics within the facility. These sensors could collect sensor readings and communicate the sensor readings to the controller 104 via the gateway infrastructure node 112. The leaf nodes 110a-110e could also represent actuators that can receive control signals from the controller 104 and adjust the operation of the industrial facility. In this way, the leaf nodes 110a-110e may include or operate in a similar manner as the process elements 102 that are physically connected to the controller 104. The leaf nodes 110a-110e could further represent handheld user devices (such as INTELATRAC devices from HONEYWELL INTERNATIONAL INC.), mobile stations, programmable logic controllers (PLCs), or any other or additional devices.

In particular embodiments, the leaf nodes 110a-110e can include 802.15.4-based low data-rate sensors and 802.11-based high data-rate devices, and the various nodes in FIG. 1 form a mesh network communicating at 2.4 GHz or 5.8 GHz. Also, in particular embodiments, data can be injected into the wireless mesh network through the infrastructure nodes, thus providing versatile, multifunctional, plant-wide coverage for wireless sensing, asset location tracking, personnel tracking, wireless communications, and any other or additional functionality as desired.

The gateway infrastructure node 112 communicates wirelessly with, transmits data to, and receives data from one or more infrastructure nodes 108a-108e and possibly one or more leaf nodes 110a-110e. The gateway infrastructure node 112 also converts data between the protocol(s) used by the network 106 and the protocol(s) used by the nodes 108a-108e and 110a-110e. For example, the gateway infrastructure node 112 could convert Ethernet-formatted data (transported over the network 106) into a wireless protocol format (such as an IEEE 802.11a, 802.11b, 802.11g, 802.11n, 802.15.3, 802.15.4, or 802.16 protocol format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In this example, a wireless configuration and OLE for Process Control (OPC) server 114 can be used to configure and control various aspects of the process control system 100. For example, the server 114 could be used to configure the operation of the infrastructure nodes 108a-108e and the gateway node 112. The server 114 could also be used to support security in the industrial control and automation system 100. For instance, the server 114 could distribute cryptographic keys or other security data to various components in the industrial control and automation system 100, such as to the nodes 108a-108e, 110a-110e, and 112. The server 114 includes any hardware, software, firmware, or combination thereof for configuring wireless networks and providing security information.

In one aspect of operation, the nodes 108a-108e, 110a-110e, 112 in the wireless network can transmit various types of data, some of which may be more important than others. Also, data from some nodes may be more or less important than similar data from other nodes. As a result, different nodes or types of data within the system 100 may have different quality of service (QoS) or other requirements. Also, these QoS or other requirements may not be static and could vary, such as varying by time, node locations, or applications supported by the nodes. However, it is also possible that the underlying wireless protocol(s) used in the wireless network (such as in the physical, Medium Access Control or "MAC", and network layers) may be unaware of these different requirements (such as when the underlying wireless protocols cannot be changed). The underlying wireless protocols might therefore provide the same level of service to all nodes and all types of data.

In some embodiments, communications between the leaf nodes 110a-110e and the infrastructure nodes 108a-108e, 112 are based on time slotting schemes, which allocate a time slot to each leaf node for transmitting data messages to and/or receiving data messages from the leaf node's associated infrastructure or gateway infrastructure nodes. For example, an infrastructure node could communicate with one leaf node in a first time slot, another leaf node in a second time slot, and so on. The frequency of the time slot for a particular leaf node may depend, among other things, on the rate at which the leaf node transmits and receives its data messages.

To provide distinct QoS-aware levels of service to different nodes in the system 100, communications with a leaf node can be extended, continued beyond, or otherwise occur outside of that leaf node's normal time slot. For example, a first leaf node's time slot can be extended or continued into a second leaf node's time slot if the first leaf node has a higher priority than the second leaf node. The priorities of the nodes can be assigned in any suitable manner, such as by a user or by the nodes themselves. Moreover, the priorities of the nodes could change over time, such as when the priorities of the nodes change as conditions in the system 100 change. As another example, the priority of a node may change based on the type of data messages transmitted by the node. For instance, periodically published data or diagnostic data could have a lower priority than alarm data. In this example, a first leaf node's time slot can be extended or continued into a second leaf node's time slot if the first leaf node's data message has a higher priority than the second leaf node's data message. In this document, the phrases "higher priority message" and "lower priority message" can be used to denote messages associated with different priorities, whether the different priorities are based on the priorities of source or destination nodes, the type of data in the messages, or any other basis. Similarly, the phrases "higher priority leaf node" and "lower priority leaf node" can be used to denote leaf nodes associated with different priorities, whether the different priorities are based on the priorities assigned to the nodes, the types of data being transmitted by the nodes, or any other basis.

A determination of whether to allow communications outside of a leaf node's assigned time slots can be made in any suitable manner. For example, in some embodiments, a leaf node may request (during its assigned time slot) that communications continue beyond or otherwise occur outside of that node's assigned time slot. If the request is granted by an infrastructure node (gateway or other), the leaf node may communicate during one or more subsequent time slots that are not the leaf node's normal slots. During the one or more subsequent time slots, the infrastructure node can ignore communications from any lower priority leaf nodes and can continue to communicate with the higher priority leaf node. In particular embodiments, lower priority leaf nodes can be signaled to not communicate during the subsequent time slots, thereby helping to reduce or avoid collisions. In other particular embodiments, the leaf nodes use different frequencies or sets of frequencies to communicate, and the lower priority leaf nodes can be ignored by not tuning a receiver or other device to the lower priority leaf nodes' frequencies or sets of frequencies.

As another example, in some embodiments, an infrastructure node can also allow communications with a leaf node to occur beyond or outside of that leaf node's assigned time slots, such as when the infrastructure node has additional data messages to communicate to higher priority leaf nodes. In these embodiments, the infrastructure node can decide to allow communications to occur outside of the leaf node's assigned time slots and can take appropriate action (such as notifying the higher and lower priority leaf nodes of the decision).

Other techniques could also be used to facilitate more reliable communications with higher priority leaf nodes. For example, multiple infrastructure nodes could be assigned to a higher priority leaf node, such as when a redundant pair of infrastructure nodes communicates with a single higher priority leaf node. In these embodiments, the higher priority leaf node could engage in continuous or near-continuous communications with its multiple assigned infrastructure nodes.

The infrastructure nodes can also engage in routing decisions to increase the likelihood of data messages associated with higher priority leaf nodes reaching their intended destinations. For example, one or multiple infrastructure nodes could receive data messages from higher priority leaf nodes and lower priority leaf nodes, and the infrastructure nodes could use these priorities to select routes for the messages through the wireless network. As particular examples, when a message from a leaf node reaches its assigned infrastructure node, the infrastructure node may choose to send the message over one or multiple routes to one or more gateway infrastructure nodes or other destination(s). The number of routes selected may depend on the priority of the message or its associated leaf node. The infrastructure node could choose a single route to send a lower priority message, and the infrastructure node could broadcast a higher priority message so that the higher priority message reaches its destination through multiple or all available routes in the wireless network. As another example, messages associated with higher and lower priorities could be routed over the same routes, but the higher priority messages could be routed first by the infrastructure nodes (even if doing so causes the lower priority messages to be delayed or dropped).

In addition, when transmitting a higher priority message, an infrastructure node may request an acknowledgement from a gateway infrastructure node or other destination to guarantee that the higher priority message reaches its destination(s). If an acknowledgement is not received, the infrastructure node may again broadcast the higher priority message. This may help to guarantee that messages from a higher priority device are delivered, even if messages from lower priority devices are lost or sometimes do not get adequate service. Acknowledgements may or may not be used for lower priority messages.

In these ways, the nodes in a wireless network may help to provide improved message delivery to and from higher priority leaf nodes. For example, infrastructure nodes can extend or otherwise alter the time slots used by the leaf nodes, which may allow prolonged communications to and from the higher priority leaf nodes. This may allow, for instance, more important data to be sent to or received from the higher priority nodes. Also, the infrastructure nodes can control the routing of data over the wireless network and give priority to data associated with higher priority leaf nodes. Once again, this may allow more important data to be delivered to or received from the higher priority nodes.

Although FIG. 1 illustrates one example of an industrial control and automation system 100, various changes may be made to FIG. 1. For example, the industrial control and automation system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. Further, while the improved message delivery mechanisms described above have been described as being used to support message transport to and from higher priority leaf nodes, the same or similar techniques could be used to support message transport to and from other types of nodes (such as higher priority infrastructure nodes). In addition, while described as supporting a wireless network, the industrial control and automation system 100 could support any number of wireless networks, at least one of which can use the improved message delivery mechanisms described above.

Figure 2:
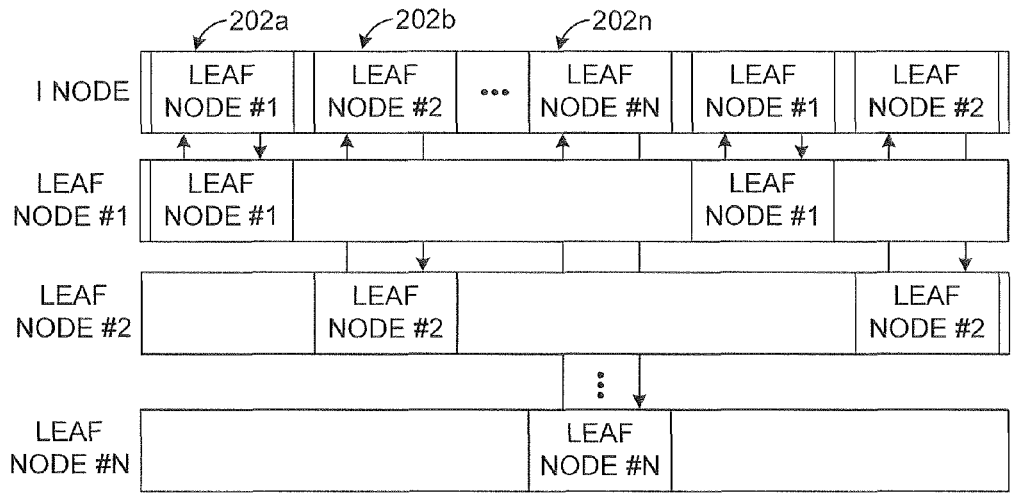
FIGS. 2 and 3 illustrate example communications between nodes in an industrial control and automation system according to this disclosure.
Figure 3:
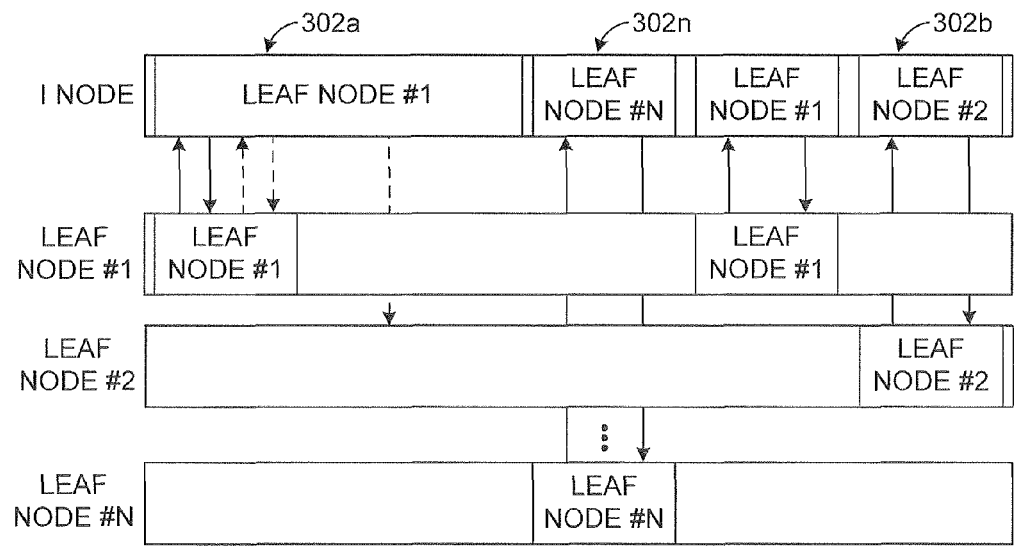

FIGS. 2 and 3 illustrate example communications between nodes in an industrial control and automation system according to this disclosure. The embodiments of the communications shown in FIGS. 2 and 3 are for illustration only. Other communications could occur between the nodes without departing from the scope of this disclosure.

As shown in FIG. 2, communications between an infrastructure node and multiple leaf nodes occur during a sequence of time slots 202a-202n, which can be repeated any number of times. During each of the time slots 202a-202n, one of the leaf nodes can transmit data to and/or receive data from the infrastructure node. Small periods of time may exist between time slots to account for, among other things, clock drift in the nodes and travel times for wireless signals. In FIG. 2, all of the time slots 202a-202n may have an equal length. It may be noted, however, that each of the time slots 202a-202n could have any suitable duration and frequency over time.

As shown in FIG. 3, the time slots 302a-302n for communications involving the leaf nodes have been altered compared to the time slots 202a-202n in FIG. 2. In FIG. 3, the time slot 302a for the first leaf node has been extended beyond its normal duration and overrun at least one subsequent time slot. This may occur, for example, when the first leaf node requests additional time or the infrastructure node provides additional time to the first leaf node on its own.

In some embodiments, the time slot 302a for the first leaf node can be extended into the time slots of any lower priority nodes or any nodes having lower priority messages. For example, the first leaf node may need to have a higher priority than the second leaf node in order to overrun into the second leaf node's time slot, or the first leaf node's message may need to have a higher priority than the second leaf node's message in order to overrun into the second leaf node's time slot. In this example, the time slot 302a has been extended into the next consecutive time slot during a sequence of time slots. However, in other embodiments, a higher priority leaf node could be granted permission to communicate in a non-consecutive time slot of a lower priority leaf node. For instance, the first leaf node could have a lower priority than the second leaf node and a higher priority than the third leaf node. In this example, the first leaf node may not be able to receive additional communication time during the second time slot (which belongs to the second leaf node), but the first leaf node may be able to receive additional time during the third time slot (which belongs to the third leaf node). In other words, the system 100 can operate to provide additional time for communications with a leaf node in any suitable manner.

The dashed lines in FIG. 3 may represent the first leaf node requesting additional time and the infrastructure node notifying the first and second leaf nodes that additional time is being provided to the first leaf node. Note that at least some of these communications could be omitted depending on how the leaf nodes or the infrastructure node operates. For instance, the infrastructure node could receive a request for additional time and inform only the first leaf node of its decision. The second leaf node could be ignored by the infrastructure node, and the second leaf node could re-transmit the same data during a later time slot.

Although FIGS. 2 and 3 illustrate examples of communications between nodes in an industrial control and automation system, various changes may be made to FIGS. 2 and 3. For example, any suitable number of time slots may be used during communications with any suitable number of leaf nodes. Also, some leaf nodes could be assigned more time slots than other leaf nodes, and the time slots need not be periodic or have a common length.

Figure 4:
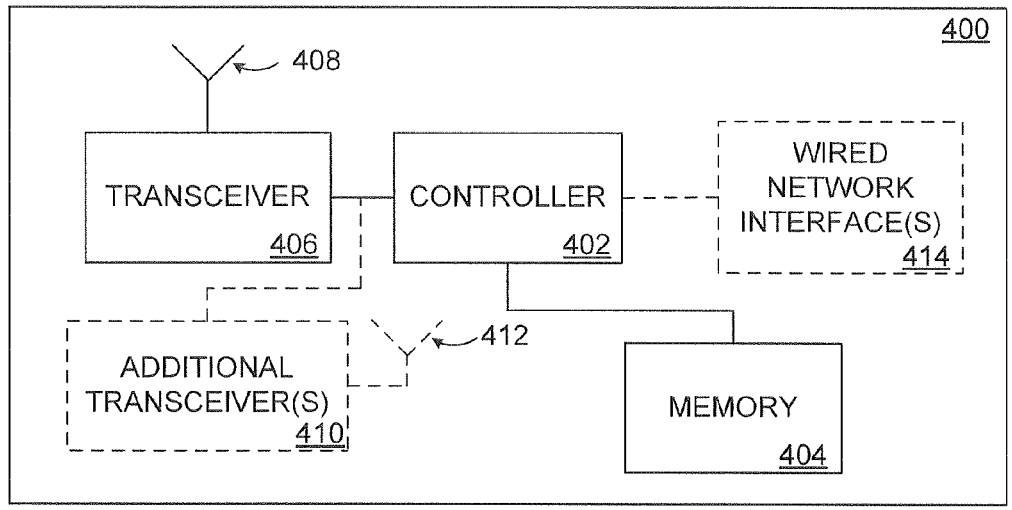
FIG. 4 illustrates an example wireless node in an industrial control and automation system according to this disclosure.

FIG. 4 illustrates an example wireless node 400 in an industrial control and automation system according to this disclosure. The wireless node 400 could, for example, represent a leaf node, infrastructure node, or gateway infrastructure node in the system 100 of FIG. 1 or other system. The embodiment of the wireless node 400 shown in FIG. 4 is for illustration only. Other embodiments of the wireless node 400 could be used without departing from the scope of this disclosure.

As shown in FIG. 4, the device 400 includes a controller 402. The controller 402 controls the overall operation of the device 400. For example, the controller 402 may receive or generate data to be transmitted externally, and the controller 402 could provide the data to one or more other components in the device 400 for transmission over a wired or wireless network. The controller 402 could also receive data over a wired or wireless network and use or pass on the data. As a particular example, the controller 402 in a sensor leaf node could provide sensor data for transmission, and the controller 402 in an actuator leaf node could receive and implement control signals (note that a leaf node could represent a combined sensor-actuator device). As another example, the controller 402 in an infrastructure node could receive data transmitted wirelessly, determine a next hop for the data (if any), and provide the data for transmission to the next hop (if any). As a third example, the controller 402 in a gateway infrastructure node 112 could receive data from a wired network and provide the data for wireless transmission (or vice versa). The controller 402 could perform any other or additional functions to support the operation of the device 400, such as the assignment, re-assignment, and extension of time slots used during communications involving the device 400. The controller 402 includes any suitable hardware, software, firmware, or combination thereof for controlling the operation of the device 400. As particular examples, the controller 402 could represent a processor, microprocessor, microcontroller, field programmable gate array (FPGA), or other processing or control device.

A memory 404 is coupled to the controller 402. The memory 404 stores any of a wide variety of information used, collected, or generated by the device 400. For example, the memory 404 could store information received over one network that is to be transmitted over the same or different network. The memory 404 includes any suitable volatile and/or non-volatile storage and retrieval device or devices.

The device 400 also includes a wireless transceiver 406 coupled to an antenna 408. The transceiver 406 and antenna 408 can be used by the device 400 to communicate wirelessly with other devices. For example, in a leaf node, the transceiver 406 and antenna 408 can be used to communicate with infrastructure nodes. In an infrastructure node or gateway infrastructure node, the transceiver 406 and antenna 408 can be used to communicate with leaf nodes. One or more additional transceivers 410 could also be used in the device 400. For instance, in an infrastructure node or gateway infrastructure node, the additional transceiver(s) 410 could be used to communicate with wireless fidelity (WiFi) devices (such as wireless controllers or hand-held user devices) and with other infrastructure nodes or gateway infrastructure nodes. The additional transceivers 410 may be coupled to their own antennas 412 or share one or more common antennas (such as antenna 408). Each transceiver includes any suitable structure for transmitting and/or receiving wireless signals. In some embodiments, each transceiver represents a radio frequency (RF) transceiver, and each antenna represents an RF antenna (although any other suitable wireless signals could be used to communicate). Also, each transceiver could include a transmitter and a separate receiver.

If the device 400 represents a gateway infrastructure node, the device 400 may further include one or more wired network interfaces 414. The wired network interfaces 414 allow the device 400 to communicate over one or more wired networks, such as the network 106. Each wired network interface 414 includes any suitable structure for transmitting and/or receiving signals over a wired network, such as an Ethernet interface.

In some embodiments, the device 400 may represent a leaf node in the system 100. In these embodiments, the controller 402 could determine that it needs to send or receive additional information outside of its assigned time slots, and the controller 402 could request additional time from an associated infrastructure node. If granted, the controller 402 may continue communications with the infrastructure node, even after the leaf node's normal time slot has expired.

In other embodiments, the device 400 may represent an infrastructure node (gateway or other) in the system 100. In these embodiments, the controller 402 could receive requests for additional time from one or more leaf nodes, or the controller 402 could determine on its own that additional information needs to be sent to or received from a leaf node. In these cases, the controller 402 can grant additional time to the leaf node for communications, thereby extending the leaf node's time slots. The controller 402 could also initiate communications to one or more of the leaf nodes to inform the leaf nodes of the time slot changes.

In addition, the controller 402 in an infrastructure node (gateway or other) could make routing decisions for controlling how data messages are routed through a wireless network. For example, higher priority messages could each be routed over multiple routes in the wireless network, while lower priority messages could each be routed over one route in the wireless network. Alternatively, messages can be routed over the same routes, and the infrastructure node could route the higher priority messages first. The controller 402 could further use acknowledgements (or lack thereof) to determine whether to re-transmit a data message. In particular embodiments, lower priority messages could be transmitted only once, while higher priority messages could be transmitted multiple times (such as up to a maximum number of times or until an acknowledgement is received).

Although FIG. 4 illustrates one example of a wireless node 400 in an industrial control and automation system, various changes may be made to FIG. 4. For example, various components in FIG. 4 could be combined, subdivided, or omitted and additional components could be added according to particular needs. Also, in general, a "wireless node" may represent any device that can transmit and/or receive data wirelessly (even if the "wireless node" has the ability to transmit and/or receive data over a wired connection, as well).

Figure 6:
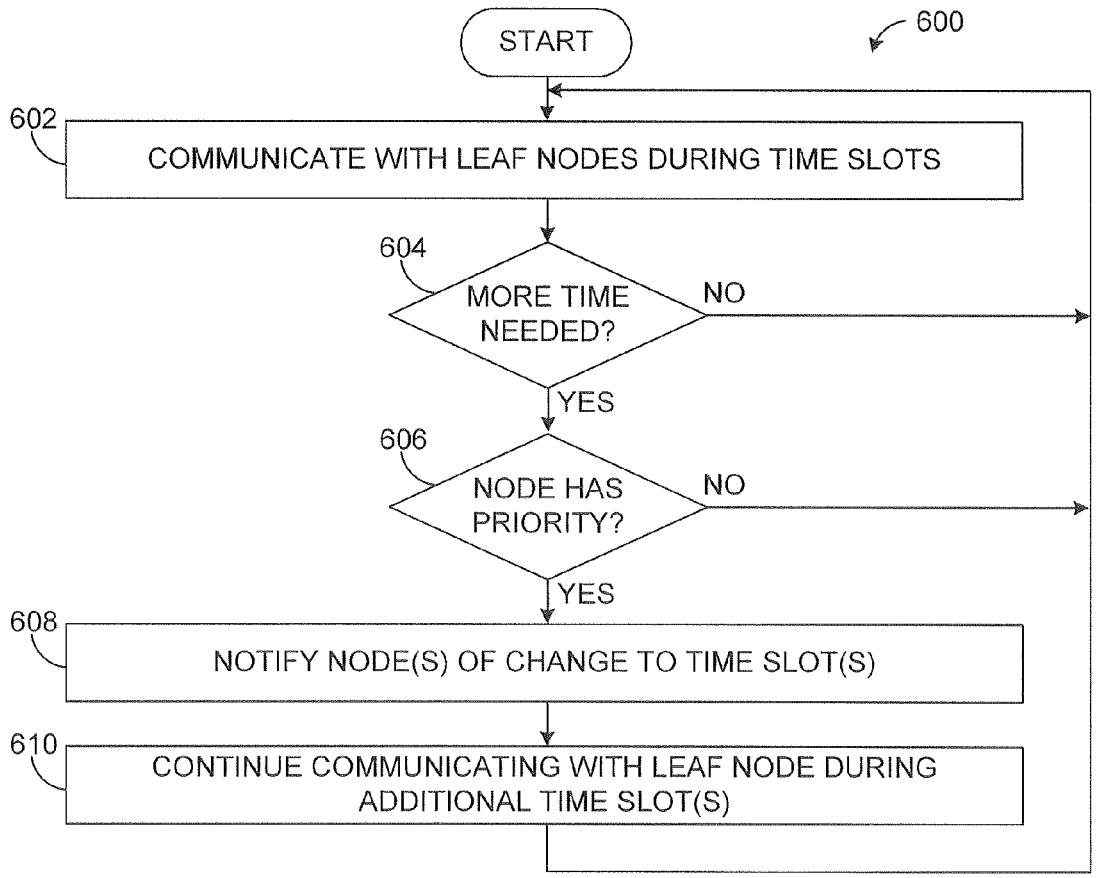
FIGS. 5 through 7 illustrate example methods for providing improved message delivery for higher priority nodes or messages in an industrial control and automation system according to this disclosure.
Figure 5:
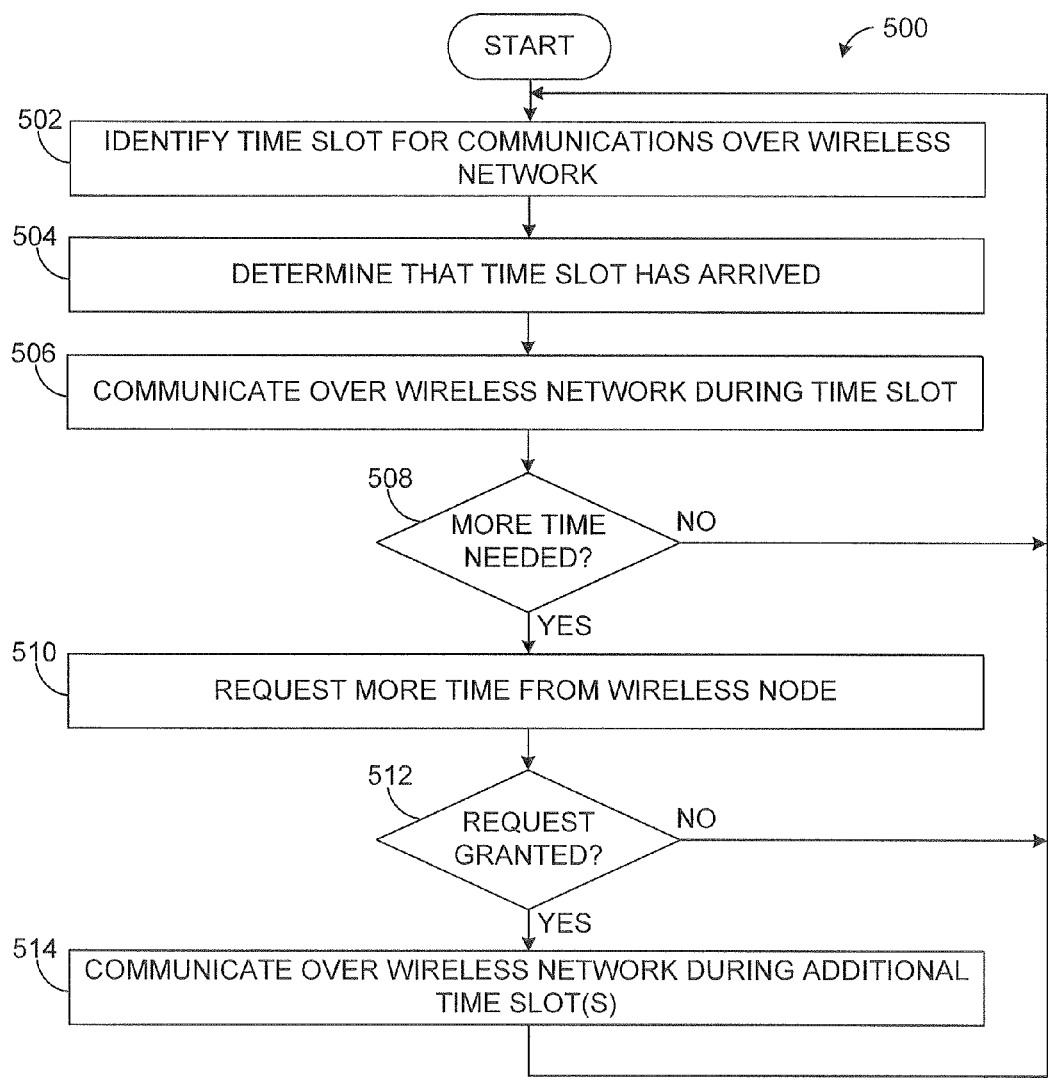
Figure 7:
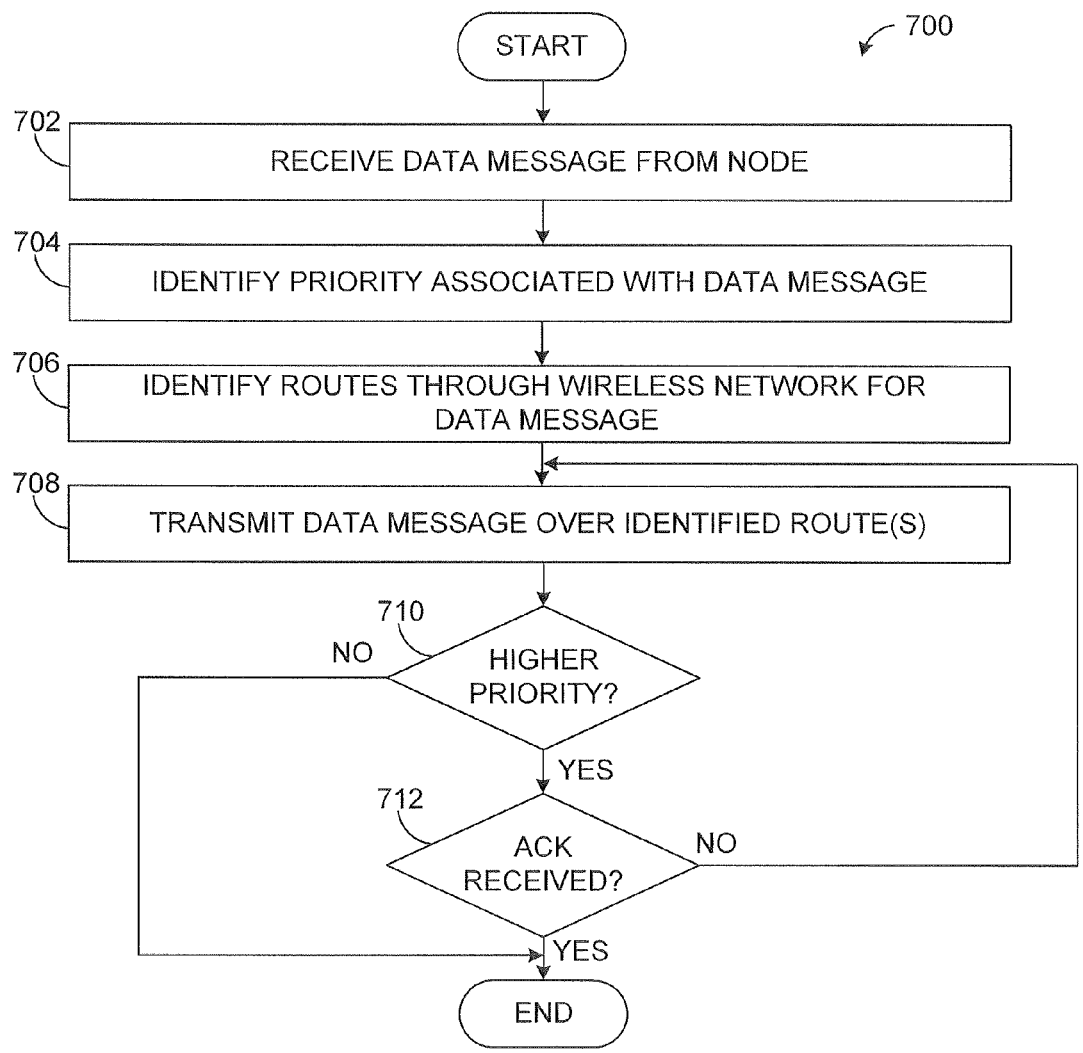

FIGS. 5 through 7 illustrate example methods for providing improved message delivery for higher priority nodes or messages in an industrial control and automation system according to this disclosure. The embodiments of the methods shown in FIGS. 5 through 7 are for illustration only. Other embodiments of the methods could be used without departing from the scope of this disclosure.

As shown in FIG. 5, a method 500 includes a leaf node identifying a time slot for communications over a wireless network at step 502. This may include, for example, the leaf node identifying the time slot in which it may transmit data to or receive data from one or more infrastructure nodes. The time slot can be identified in any suitable manner, such as based on information received from the infrastructure node that identifies the leaf node's time slot.

The leaf node determines that its time slot has arrived at step 504. This may include, for example, the controller in the leaf node monitoring a current time or the amount of time that has elapsed since a particular event (such as the beginning or conclusion of a prior time slot). Once the time slot has arrived, the leaf node communicates over the wireless network at step 506. This may include, for example, the leaf node transmitting data to its associated infrastructure node or receiving data from the infrastructure node. The leaf node may continue to communicate until its time slot expires.

At some point (such as prior to expiration of the leaf node's time slot), the leaf node determines if more time is needed for communications at step 508. This may include, for example, the controller in the leaf node determining that it needs to transmit additional data or that it needs to receive additional data.

If additional time is not needed, the leaf node may return to step 502 to identify its next time slot for communication. Otherwise, if additional time is needed, the leaf node requests additional time from another wireless node at step 510. This may include, for example, the leaf node requesting additional time from its associated infrastructure node. If the additional time is not granted at step 512, the leaf node may again return to step 502 to identify its next time slot for communication. Otherwise, if additional time is granted, the leaf node may continue communicating over the wireless network during one or more additional time slots at step 514. Once the additional time slots are complete, the leaf node may return to step 502 (although the leaf node could also return to step 508 to determine if still more time is needed).

As shown in FIG. 6, a method 600 includes an infrastructure node communicating with multiple leaf nodes during multiple time slots at step 602. This may include, for example, the infrastructure node transmitting data to and receiving data from each of the leaf nodes during that leaf node's specified time slots.

The infrastructure node determines if more time is needed to communicate with a particular leaf node at step 604. This could be done, for example, in response to a request for additional time received from the leaf node. This could also be done in response to the controller in the infrastructure node determining that additional data needs to be sent to or received from the leaf node.

If additional time is needed for communications with a particular leaf node, the infrastructure node determines if the priority of the leaf node allows the additional time at step 606. This may include, for example, the controller in the infrastructure node determining the priority associated with the leaf node that needs additional time (or the priority of the type of data to be transmitted by the leaf node that needs additional time). This may also include determining the priority of the leaf nodes associated with subsequent consecutive or non-consecutive time slots (or the priority of the type of data to be transmitted by the leaf nodes associated with the subsequent time slots). This may further include comparing the priority of the leaf node needing additional time to the priority or priorities of other leaf node(s).

If the leaf node needing additional time has a higher priority, one or more leaf nodes can be notified about a change in the nodes' time slots at step 608, and communications with the leaf node needing additional time continue into one or more additional time slots at step 610. This may include, for example, allowing communications with the leaf node needing additional time to continue even after that leaf node's normal time slot has expired. This may also include the infrastructure node informing one or more other leaf nodes that their time slots have been taken away. It may be noted that no communications with the other leaf nodes could occur. In this case, data transmissions from those other leaf nodes can be ignored during step 610, and the other leaf nodes could re-transmit the same data during subsequent time slots.

As shown in FIG. 7, an infrastructure node receives a message from another node, such as a leaf node, at step 702. The message could be received, for example, during that leaf node's specified time slot or during additional time granted to the leaf node. A priority associated with the data message is determined at step 704. This may include, for example, the infrastructure node identifying a priority assigned to the leaf node that provided the data message or a priority associated with the type of data message received. The priority could be determined using any other suitable information, such as the contents of the message.

One or more routes through the wireless network are identified at step 706. This may include, for example, the infrastructure node identifying a number of routes based on the identified priority associated with the data message. As a particular example, higher priorities could be associated with more routes, and lower priorities could be associated with fewer or single routes through the wireless network. Alternatively, higher and lower priorities could be associated with the same route(s), and higher priority messages could be routed before lower priority messages are routed. The data message is then transmitted over the identified route(s) at step 708. This could include, for example, the infrastructure node transmitting a message associated with a lower priority to the next hop in a single communication route. This may also include the infrastructure node broadcasting a message associated with a higher priority to any nodes within communication range of the infrastructure node or to any nodes having an active link with the infrastructure node.

If the message represents a higher priority message at step 710, the infrastructure node determines whether an acknowledgement has been received at step 712. If the message is a lower priority message or an acknowledgement has been received, the method 700 ends. At this point, the method 700 could be repeated to handle additional messages sent to or received from a leaf node. If the message is a higher priority message and an acknowledgement has not been received, the infrastructure node returns to step 708 to re-transmit the data message. The data message could be re-transmitted any number of times, such as up to a specified number of retries.

In these ways, the infrastructure nodes (gateway or other) in a wireless network may help to provide improved message delivery to and from higher priority leaf nodes. Moreover, this can be done even when protocol layers in the nodes (such as the physical, MAC, or network layers) are unaware of different QoS or other requirements of data traffic in the wireless network.

Although FIGS. 5 through 7 illustrate examples of methods for providing improved message delivery for higher priority nodes or messages in an industrial control and automation system, various changes may be made to FIGS. 5 through 7. For example, while shown as a series of steps in each figure, various steps in FIGS. 5 through 7 could overlap, occur in parallel, occur multiple times, or occur in a different order. Also, other changes could be made to these figures depending on the particular implementation, such as when acknowledgements are expected for all data messages in FIG. 7.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
communicating, during a first time slot, with a first wireless node in a wireless network;
determining that the communication with the first wireless node requires additional time beyond the first time slot;
identifying a priority associated with the first wireless node;
identifying a priority associated with a second wireless node in the wireless network, the second wireless node associated with a second time slot; and
communicating, during the second time slot, with the first wireless node when the priority associated with the first wireless node exceeds the priority associated with the second wireless node.

2. The method of claim 1, wherein determining that the communication with the first wireless node requires the additional time comprises receiving a request for the additional time from the first wireless node.

3. The method of claim 1, wherein determining that the communication with the first wireless node requires the additional time comprises determining that information needs to be transmitted to or received from the first wireless node after expiration of the first time slot.

4. The method of claim 3, wherein determining that the information needs to be transmitted to or received from the first wireless node comprises determining that at least one data message needs to be transmitted to or received from the first wireless node after expiration of the first time slot.

5. The method of claim 1, wherein:
the first and second wireless nodes communicate using different frequencies or sets of frequencies; and
further comprising ignoring a communication from the second wireless node during the second time slot.

6. The method of claim 1, wherein identifying the priority associated with the first wireless node and identifying the priority associated with the second wireless node comprise using at least one of: a priority assigned to each of the wireless nodes and a priority associated with data to be transmitted by each of the wireless nodes.

7. The method of claim 1, further comprising:
identifying at least one first route through the wireless network for data associated with the first wireless node and at least one route through the wireless network for data associated with the second wireless node.

8. The method of claim 7, wherein the at least one first route is based on the priority associated with the first wireless node and the at least one second route is based on the priority associated with the second wireless node.

9. The method of claim 7, further comprising:
routing data associated with the first wireless node before routing data associated with the second wireless node.

10. The method of claim 1, further comprising:
determining if an acknowledgement is received in response to communication of data associated with the first wireless node; and
communicating the data associated with the first wireless node again when no acknowledgement is received.

11. The method of claim 1, wherein each of the wireless nodes comprises at least one of: a sensor and an actuator in an industrial control and automation system.

12. An apparatus comprising:
at least one transceiver configured to communicate with a plurality of wireless nodes in a wireless network; and
at least one controller configured to:
communicate with a first of the wireless nodes during a first time slot;
determine that the communication with the first wireless node requires additional time beyond the first time slot;
identify a priority associated with the first wireless node;
identify a priority associated with a second of the wireless nodes, the second wireless node associated with a second time slot; and
continue to communicate with the first wireless node during the second time slot when the priority associated with the first wireless node exceeds the priority associated with the second wireless node.

13. The apparatus of claim 12, wherein the at least one controller is configured to determine that the communication with the first wireless node requires the additional time by receiving a request for the additional time from the first wireless node.

14. The apparatus of claim 12, wherein the at least one controller is configured to determine that the communication with the first wireless node requires the additional time by determining that at least one data message needs to be transmitted to or received from the first wireless node after expiration of the first time slot.

15. The apparatus of claim 12, wherein:
the first and second wireless nodes are configured to communicate using different frequencies or sets of frequencies; and
the at least one controller is further configured to ignore a communication from the second wireless node during the second time slot.

16. The apparatus of claim 12, wherein the at least one controller is further configured to identify at least one first route through the wireless network for data associated with the first wireless node and at least one second route through the wireless network for data associated with the second wireless node.

17. The apparatus of claim 12, wherein the at least one controller is further configured to:
determine if an acknowledgement is received in response to communication of data associated with the first wireless node; and
communicate the data associated with the first wireless node again when no acknowledgement is received.

18. A method comprising:
receiving data from a first wireless node in a wireless network;
identifying a priority associated with the first wireless node;
identifying at least one first route through the wireless network for the data from the first wireless node, the at least one first route based on the priority associated with the first wireless node; and
communicating the data from the first wireless node along the at least one first route.

19. The method of claim 18, further comprising:
receiving data from a second wireless node in the wireless network;

identifying a priority associated with the second wireless node;

identifying at least one second route through the wireless network for the data from the second wireless node, the at least one second route based on the priority associated with the second wireless node; and communicating the data from the second wireless node along the at least one second route.

20. The method of claim 19, wherein:

the first wireless node has a higher priority than the second wireless node;

the at least one first route comprises multiple routes; and the at least one second route comprises a single route.

* * * * *